US012597227B2

(12) United States Patent
Liang

(10) Patent No.: US 12,597,227 B2
(45) Date of Patent: Apr. 7, 2026

(54) IMAGE DEHAZING METHOD AND VIDEO DEHAZING METHOD

(71) Applicant: ALi Corporation, Hsinchu (TW)

(72) Inventor: Lun Liang, Guangdong (CN)

(73) Assignee: ALi Corporation, Hsinchu (TW)

( * ) Notice: Subject to any disclaimer, the term of this patent is extended or adjusted under 35 U.S.C. 154(b) by 291 days.

(21) Appl. No.: 18/359,861

(22) Filed: Jul. 26, 2023

(65) Prior Publication Data

US 2024/0037901 A1     Feb. 1, 2024

(30) Foreign Application Priority Data

Jul. 29, 2022    (CN) .......................... 202210906604.7

(51) Int. Cl.
| | |
|---|---|
| *G06T 5/00* | (2024.01) |
| *G06T 5/20* | (2006.01) |
| *G06V 10/56* | (2022.01) |
| *G06V 10/60* | (2022.01) |

(52) U.S. Cl.
CPC ............... *G06V 10/60* (2022.01); *G06T 5/20* (2013.01); *G06V 10/56* (2022.01); *G06T 2207/10016* (2013.01); *G06T 2207/10024* (2013.01)

(58) Field of Classification Search
CPC ................... G06V 10/56; G06V 10/60; G06T 2207/10024; G06T 5/73; G06T 2207/00; G06T 5/00; G06T 7/00
See application file for complete search history.

(56) References Cited

U.S. PATENT DOCUMENTS

| | | | | |
|---|---|---|---|---|
| 2020/0394767 A1* | 12/2020 | Li | .............................. | G06T 5/92 |
| 2023/0306569 A1* | 9/2023 | Hong | ........................ | G06T 7/90 |

FOREIGN PATENT DOCUMENTS

| | | | | | |
|---|---|---|---|---|---|
| CN | 105976338 A | * | 9/2016 | ............... | G06T 5/73 |
| CN | 110782407 A | * | 2/2020 | ............... | G06T 7/90 |

OTHER PUBLICATIONS

Lee, Sungmin, et al. "A review on dark channel prior based image dehazing algorithms." EURASIP Journal on Image and Video Processing 2016.1 (2016): 4.*

Agrawal, Subhash Chand, and Anand Singh Jalal. "A comprehensive review on analysis and implementation of recent image dehazing methods." Archives of Computational Methods in Engineering 29.7 (2022): 4799-4850.*

* cited by examiner

*Primary Examiner* — Li Liu

(57) ABSTRACT

Disclosed is an image dehazing method, including: obtaining a second dark channel map corresponding to a target image based on a first dark channel value corresponding to each pixel in the target image; obtaining an atmospheric light value; obtaining a haze intensity value; obtaining a dehazing intensity correction value based on the haze intensity value, a first dark channel value corresponding to each pixel in a first dark channel map, or a brightness value corresponding to each pixel in the target image; obtaining an estimated value of a transmittance based on the dehazing intensity correction value, a second dark channel value corresponding to each pixel in the second dark channel map, and the atmospheric light value; and obtaining an estimated dehazed image based on the estimated value of the transmittance, the target image and the atmospheric light value. Therefore, the generation of the halo effect can be avoided.

15 Claims, 5 Drawing Sheets performing dehazing processing on each frame of images in a video by the image dehazing method in step 110 to step 160, wherein the atmospheric light value corresponding to previous N frames of images in the video comprises: a default atmospheric light value; a set atmospheric light value; an atmospheric light value, which is a brightness value of the target image corresponding to a pixel with a largest first dark channel value in the first dark channel map; or an atmospheric light value, which is a average value of a plurality of brightness values of the target image corresponding to a plurality of pixels with a predetermined proportion from pixels with the first dark channel values sorted from high to low in the first dark channel map, N is a positive integer; the haze intensity value corresponding to the previous N frames of images in the video comprises: a default haze intensity value; a set haze intensity value; or a haze intensity value obtained based on an average dark channel value of the first dark channel map or an average brightness value of the target image; an atmospheric light value corresponding to each frame of images after the previous N frames of images in the video is obtained by performing a weighted average of atmospheric light values corresponding to previous M frames of images; a haze intensity value corresponding to each frame of images after the previous N frames of images in the video is obtained by performing a weighted average of haze intensity values corresponding to the previous M frames of images, and M is an integer less than or equal to N

410 combining each frame of images after dehazing into a dehazing video and output the dehazing video

IMAGE DEHAZING METHOD AND VIDEO DEHAZING METHOD

CROSS REFERENCE TO RELATED APPLICATION

This application claims the priority benefit of Chinese Patent Application Serial Number 202210906604.7, filed on Jul. 29, 2022, the full disclosure of which is incorporated herein by reference.

BACKGROUND

Technical Field

The present disclosure relates to the field of image processing, and in particular, to an image dehazing method and a video dehazing method.

Related Art

In foggy weather, due to the scattering of atmospheric particles, the image or video captured by the camera device is affected by the fog in the atmosphere, and the image quality is greatly reduced, thereby affecting the visual effect. Therefore, the dehazing algorithm is usually used to dehaze the image, so as to eliminate the fog in the image and make the processed image clearer.

However, most dehazing algorithms work poorly on the area(s) with high brightness value(s) such as the sky in the image; for example, the color distortion is generated. In addition, when most of the dehazing algorithms are used to dehaze the hazy image captured in scenes with both dense fog and mist, there is a problem that the processing effect becomes uneven because the light in the dense fog area is affected by greater attenuation and scattering than the light in the mist area.

In view of this, how to solve various problems existing in the existing image dehazing processing technology is a technical issue to be solved by those skilled in the art at present.

SUMMARY

The embodiments of the present disclosure provide an image dehazing method and a video dehazing method, which can solve the problem that in the prior art, the image dehazing process has a poor dehazing effect for the area(s) with the high brightness value(s) and the area(s) with different haze densities.

In order to solve above-mentioned technical problem, the present disclosure is implemented as follows.

In a first aspect, an image dehazing method is provided, including: obtaining a second dark channel map corresponding to a target image based on a first dark channel value corresponding to each pixel in the target image; obtaining an atmospheric light value; obtaining a haze intensity value; obtaining a dehazing intensity correction value based on the haze intensity value, a first dark channel value corresponding to each pixel in a first dark channel map, or a brightness value corresponding to each pixel in the target image; obtaining an estimated value of a transmittance based on the dehazing intensity correction value, a second dark channel value corresponding to each pixel in the second dark channel map, and the atmospheric light value; and obtaining an estimated dehazed image based on the estimated value of the transmittance, the target image and the atmospheric light value.

In a second aspect, a video dehazing method is provided, including: performing dehazing processing on each frame of images in a video by the image dehazing method of the present disclosure; wherein the atmospheric light value corresponding to previous N frames of images in the video comprises: a default atmospheric light value; a set atmospheric light value; an atmospheric light value, which is a brightness value of the target image corresponding to a pixel with a largest first dark channel value in the first dark channel map; or an atmospheric light value, which is an average value of a plurality of brightness values of the target image corresponding to a plurality of pixels with a predetermined proportion from pixels with the first dark channel values sorted from high to low in the first dark channel map, N is a positive integer; wherein the haze intensity value corresponding to the previous N frames of images in the video comprises: a default haze intensity value; a set haze intensity value; or a haze intensity value obtained based on an average dark channel value of the first dark channel map or an average brightness value of the target image; wherein an atmospheric light value corresponding to each frame of images after the previous N frames of images in the video is obtained by performing a weighted average of atmospheric light values corresponding to previous M frames of images, and a haze intensity value corresponding to each frame of images after the previous N frames of images in the video is obtained by performing a weighted average of haze intensity values corresponding to the previous M frames of images, M is an integer less than or equal to N; and combining each frame of images after dehazing into a dehazing video and output the dehazing video.

In the embodiments of the present disclosure, the image dehazing method is suitable for performing dehazing processing in units of single points or filtering windows, and can avoid the halo effect generated by performing dehazing processing in units of filtering windows. In addition, the image dehazing method of the present disclosure performs image dehazing by using the estimated value of the transmittance obtained based on the dehazing intensity correction value, so that the area(s) with the high brightness value(s) in the hazy image can still maintain appropriate brightness after being dehazed, and the area(s) with different haze densities has(have) a good dehazing effect.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 4 is a schematic flowchart of a video dehazing method according to an embodiment of the present disclosure.

DETAILED DESCRIPTION OF THE EMBODIMENTS

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Figure 1:
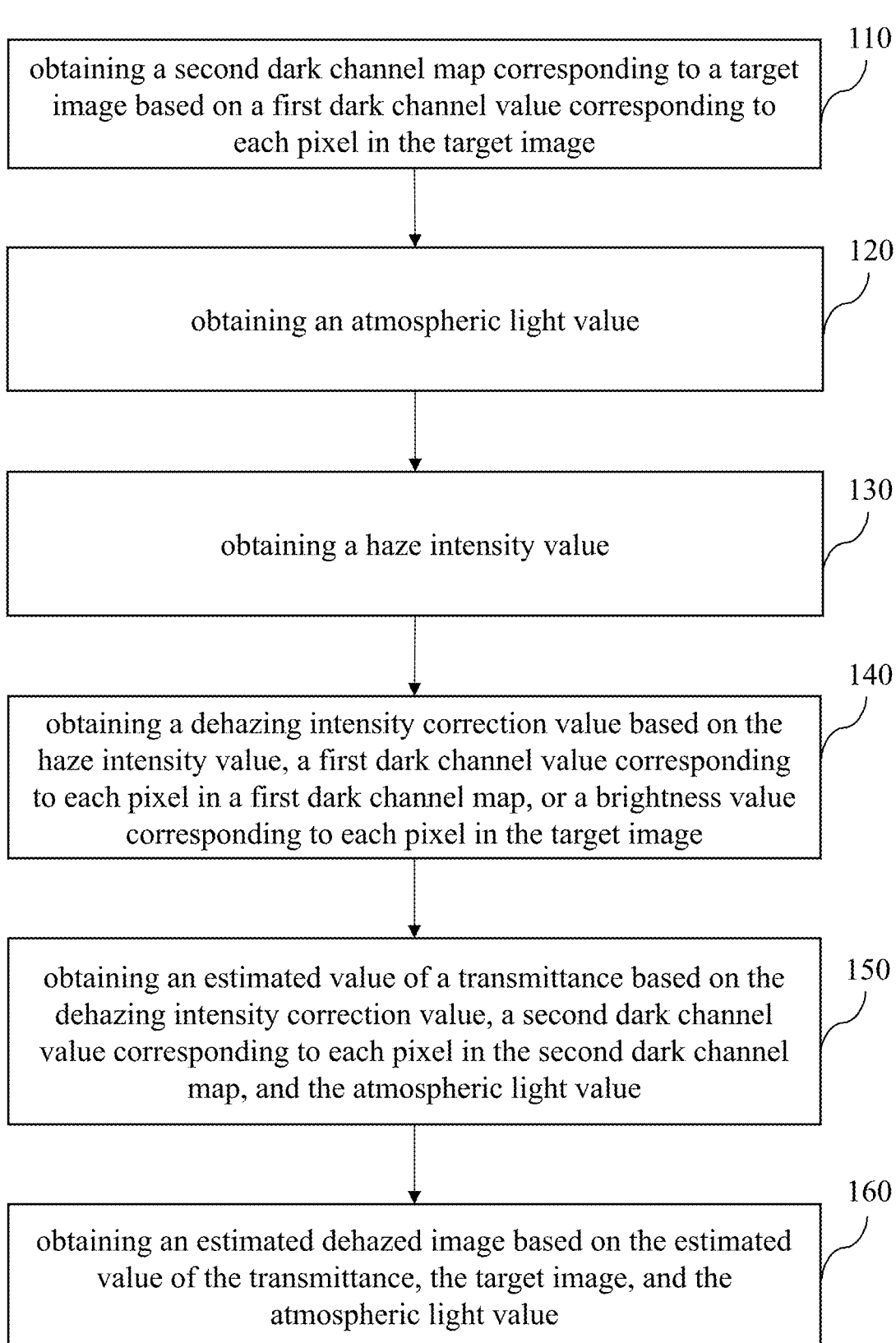
FIG. 1 is a schematic flowchart of an image dehazing method according to an embodiment of the present disclosure.

Please refer to FIG. 1, which is a schematic flowchart of an image dehazing method according to an embodiment of the present disclosure. As shown in FIG. 1, the image dehazing method comprises the following steps: obtaining a second dark channel map corresponding to a target image based on a first dark channel value corresponding to each pixel in the target image (step 110); obtaining an atmospheric light value (step 120)); obtaining a haze intensity value (step 130); obtaining a dehazing intensity correction value based on the haze intensity value, a first dark channel value corresponding to each pixel in a first dark channel map, or a brightness value corresponding to each pixel in the target image (Step 140); obtaining an estimated value of a transmittance based on the dehazing intensity correction value, a second dark channel value corresponding to each pixel in the second dark channel map, and the atmospheric light value (step 150); and obtaining an estimated dehazed image based on the estimated value of the transmittance, the target image and the atmospheric light value (step 160). Among them, J(x) is a dehazed image, I(x) is a target image (that is, the hazy image), A is an atmospheric light value, t(x) is a transmittance related to a dehazing intensity correction value, x is a spatial coordinate in the image, and based on the atmospheric scattering model, it is obtained that I(x)=t(x)× J(x)+(1−t(x))×A.

Figure 2:
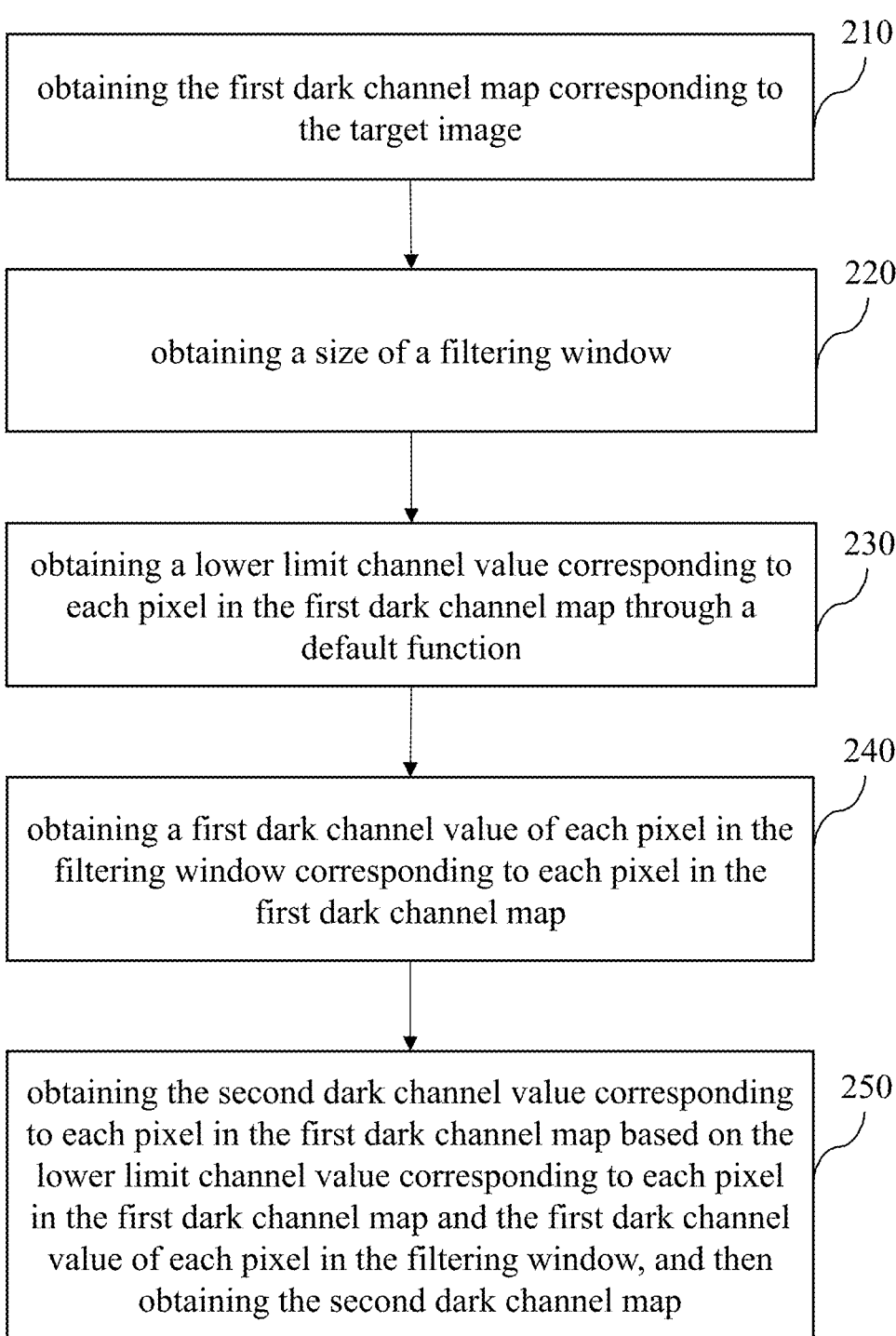
FIG. 2 is a schematic flowchart of an embodiment of step 110 in FIG. 1.

In an embodiment, please refer to FIG. 2, which is a schematic flowchart of an embodiment of step 110 in FIG. 1. As shown in FIG. 2, the image dehazing method may be suitable for performing dehazing processing in units of filtering windows. Therefore, step 110 may comprise: obtaining the first dark channel map corresponding to the target image (step 210); obtaining a size of a filtering window (step 220); obtaining a lower limit channel value corresponding to each pixel in the first dark channel map through a default function (step 230); obtaining a first dark channel value of each pixel in the filtering window corresponding to each pixel in the first dark channel map (step 240); and obtaining the second dark channel value corresponding to each pixel in the first dark channel map based on the lower limit channel value corresponding to each pixel in the first dark channel map and the first dark channel value of each pixel in the filtering window, and then obtaining the second dark channel map (step 250).

Figure 3:
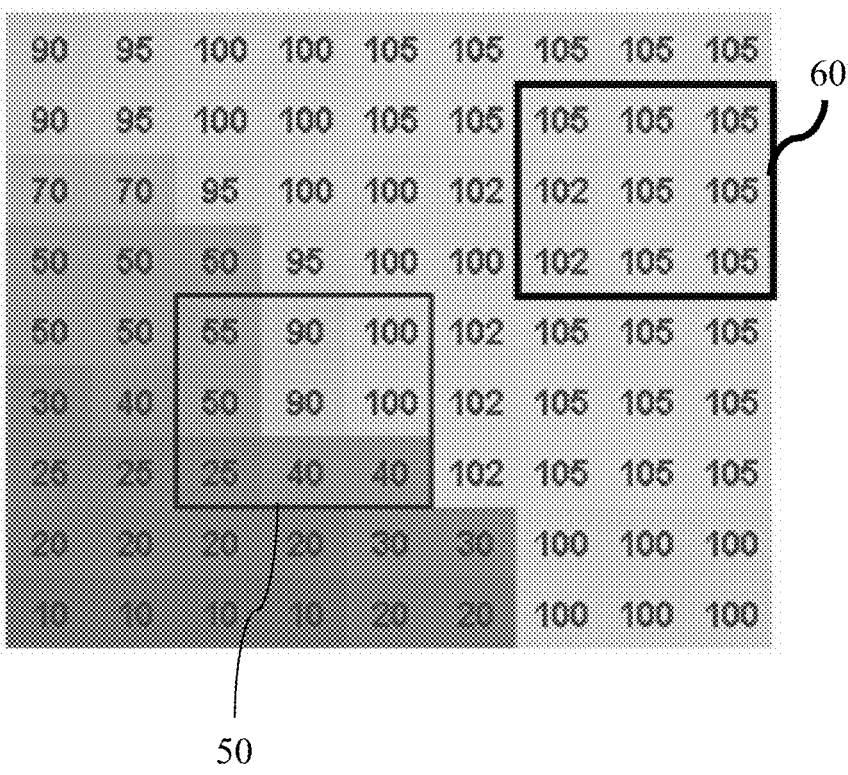
FIG. 3 is a first dark channel map according to an exemplary embodiment of the present disclosure.

In one embodiment, step 210 may comprise: selecting a minimum value of RGB components of each pixel of the target image to obtain the first dark channel map. Specifically, each pixel of the target image has the values of red (R), green (G), and blue (B) components (that is, the red channel value, the green channel value, and the blue channel value). The minimum value of the RGB channel values (i.e., $I_0$) of each pixel in the target image is selected to obtain the first dark channel map corresponding to the target image as shown in FIG. 3, which is a first dark channel map according to an exemplary embodiment of the present disclosure, wherein the first dark channel map in FIG. 3 shows the minimum value of the RGB channel values of each pixel.

In one embodiment, the size of the filtering window in step 220 can be adjusted according to actual requirements. In an example, referring to FIG. 3, the size of the filtering window may be, but not limited to, 3×3.

In one embodiment, step 230 is to perform calculation on the minimum value of the RGB channel values (i.e., the first dark channel value) of each pixel in the first dark channel map by using a default function to obtain the lower limit channel value corresponding to each pixel in the first dark channel map. The pixel with higher brightness value has a smaller difference between the minimum value of the RGB channel values (i.e., $I_0$) and the lower limit channel value, and the pixel with lower brightness value has greater difference between the minimum value of the RGB channel values (i.e., $I_0$) and the lower limit channel value, so the default function may be, but not limited to, a reciprocal function, and the actual default function may be adjusted according to actual needs. It should be noted that the lower limit channel value is a positive integer.

In one embodiment, the default function may be $$I_0 - \frac{k}{I_0},$$

where k is a configurable coefficient, such as 512 and 1024. In an example, please refer to FIG. 3, when k is 512 and the minimum value of the RGB channel values (i.e., $I_0$) of a certain pixel is 90, the lower limit channel value corresponding to the certain pixel is 85 by rounding the calculation result up to the nearest integer value. When k is 512 and the minimum value of the RGB channel values (i.e., $I_0$) of a certain pixel is 105, the lower limit channel value corresponding to the certain pixel is 101 by rounding the calculation result up to the nearest integer value.

In one embodiment, step 240 is to select each filtering window centered on each pixel in the first dark channel map (that is, each pixel is a centered pixel of the filtering window corresponding thereto) to obtain the first dark channel values of all pixels in each filtering window. In an example, referring to FIG. 3, a filtering window as shown by the thin line frame 50 in FIG. 3 is selected, the selected filtering window is centered on the pixel with the minimum value of the RGB channel values (i.e., $I_0$) being 90, and the first dark channel values of all the pixels included in the selected filtering window are 55, 90, 100, 50, 90, 100, 25, 40, and 40 respectively. A filtering window as shown by the thick line frame 60 in FIG. 3 is selected, the selected filtering window is centered on the pixel with the minimum value of the RGB channel values (i.e., $I_0$) being 105, and the first dark channel values of all the pixels included in the selected filtering window are 105, 105, 105, 102, 105, 105, 102, 105, and 105 respectively.

In one embodiment, step 250 may comprise: selecting a first dark channel value greater than or equal to the lower limit channel value in the filtering window corresponding to each pixel in the first dark channel map as a candidate dark channel value corresponding to each pixel in the first dark channel map; and selecting a minimum value among all candidate dark channel values corresponding to each pixel in the first dark channel map as the second dark channel value corresponding to each pixel in the first dark channel map. In an example, referring to FIG. 3, when the default function is $$I_0 - \frac{k}{I_0}$$

and k is 512, the lower limit channel value corresponding to the pixel with the minimum value of the RGB channel values (i.e., $I_0$) being 90 can be 85, and the first dark channel values of all the pixels included in the filtering window, which is shown by the thin line frame 50 in FIG. 3 and centered on the pixel with the minimum value of the RGB channel values (i.e., $I_0$) being 90 are 55, 90, 100, 50, 90, 100, 25, 40, and 40 respectively. Thus, only the first dark channel values of 90, 100, 90, and 100 can be used as the candidate dark channel values corresponding to the pixel with the minimum value of the RGB channel values (i.e., $I_0$) being 90, and the minimum value of these candidate dark channel values is 90, so that the second dark channel value corresponding to the pixel with the minimum value of the RGB channel values (i.e., $I_0$) being 90 is 90.

The second dark channel value of each pixel is obtained through the above step 230 to step 250, which can solve the problem that since the existing dehazing algorithm that performs dehazing in units of filter windows only performs minimum value filtering on the filter window to obtain the dark channel value of each pixel, the area(s) with high brightness value(s) in the filter window are prone to halo effect after subsequent dehazing processing, and the area(s) with different haze densities has(have) the poor dehazing effect after subsequent dehazing processing.

In one embodiment, the image dehazing method may be suitable for performing dehazing processing in units of single points. Therefore, step 110 may comprise: selecting the minimum value of RGB components of each pixel of the target image as the first dark channel value corresponding thereto (i.e., min $I^c(x)$) to obtain the second dark channel map, wherein the first dark channel value corresponding to each pixel in the target image is the second dark channel value corresponding to each pixel in the second dark channel map.

In one embodiment, step 120 may comprise: obtaining a default atmospheric light value; or setting the atmospheric light value; or selecting a brightness value of the target image corresponding to a pixel with a largest first dark channel value in the first dark channel map as the atmospheric light value; or selecting a plurality of brightness values of the target image corresponding to a plurality of pixels with a predetermined proportion from pixels with the first dark channel values sorted from high to low in the first dark channel map, and taking an average value of the plurality of brightness values as the atmospheric light value. Among them, when the atmospheric light value is the default atmospheric light value (that is, the built-in atmospheric light value) or the set atmospheric light value (that is, the atmospheric light value currently set by the user such as A=240), the bandwidth can be saved since it is not necessary to traverse the entire first dark channel map.

In one embodiment, the step of selecting the plurality of brightness values of the target image corresponding to the plurality of pixels with the predetermined proportion from pixels with the first dark channel values sorted from high to low in the first dark channel map, and taking the average value of the plurality of brightness values as the atmospheric light value may comprise: selecting the plurality of brightness values of the target image corresponding to the top 0.1% pixels from pixels with the first dark channel values sorted from high to low in the first dark channel map, and then taking the average value of the plurality of brightness values as the atmospheric light value.

In one embodiment, step 130 may comprise: obtaining a default haze intensity value; or setting the haze intensity value; or obtaining the haze intensity value (i.e., 1−p) based on an average dark channel value of the first dark channel map (i.e., mean(min $I^c(x)$)) or an average brightness value of the target image (i.e., mean(Y(x)), Y(x) is a brightness function). Among them, $$p = \frac{\text{mean(min } I^c(x))}{H}, \text{ or } p = \frac{\text{mean}(Y(x))}{H},$$

p is an estimated value of global haze intensity, and when the brightness values/first dark channel values of the red (R) channel, the green (G) channel and the blue (B) channel are stored by using F bit(s) respectively, H is equal to 2F−1, and F is a positive integer, such as 8 and 10. When the haze intensity value is the default haze intensity value (that is, the built-in fog intensity value) or the set haze intensity value (that is, the fog intensity value currently set by the user such as 0.5), the bandwidth can be saved since it is not necessary to traverse the entire first dark channel map.

In one embodiment, the estimated value of global haze intensity (i.e., p) included in the haze intensity value (i.e., 1-p) described in step 130 is obtained by formula (1), so that the dehazing intensity correction value w(x) described in step 140 is obtained by formula (2).

$$p = \frac{\text{mean}(Y(x))}{H} \tag{1}$$

$$w(x) = 1 - (1 - p) \times \frac{Y(x)}{H} \tag{2}$$

In another embodiment, the estimated value of global haze intensity (i.e., p) included in the haze intensity value (i.e., 1−p) described in step 130 is obtained by formula (3), so that the dehazing intensity correction value w(x) described in step 140 is obtained by formula (4). Among them, the pixel with dense fog has a larger first dark channel value, so w(x) should be larger to improve the degree of dehazing.

$$p = \frac{\text{mean}(\text{min}(\ I^c(x))}{H} \quad (3)$$

$$w(x) = 1 - (1 - p) \times \frac{\text{min } I^c(x)}{H} \quad (4)$$

In one embodiment, since the transmittances of different pixels are different, the larger the brightness value or the second dark channel value of the pixel, the closer the transmittance of the pixel is to 1. There, the estimated value of the transmittance (i.e., $\tilde{t}(x)$) can be obtained from formula (5), where limit_min(min $I^c(x)$/A) is the second dark channel value.

$$\tilde{t}(x) = 1 - w(x) \times \left[\text{limit\_min}\left(\frac{\text{min } I^c(x)}{H}\right)\right] \quad (5)$$

In another embodiment, the estimated value of the transmittance obtained by formula (5) can avoid calculation overflow (that is, avoid the situation where $\tilde{t}(x)$ is greater than 1) by setting the default range of the estimated value of the transmittance (i.e., by adding a limiting condition). Therefore, step 150 may comprise: obtaining the estimated value of the transmittance based on the dehazing intensity correction value, the second dark channel value corresponding to each pixel point in the second dark channel map, the atmospheric light value, and a default range. In an example, the default range of the estimated value of the transmittance (i.e., $\tilde{t}(x)$) may be greater than or equal to 0.1 and less than or equal to 1, but this example is not intended to limit the present disclosure, and the actual default range of the estimated value of the transmittance (i.e., $\tilde{t}(x)$) can be adjusted according to actual needs.

In one embodiment, the estimated dehazed image (i.e., $J^c(x)$) described in step 160 can be obtained by formula (6).

$$J^c(x) = \frac{I(x) - A}{\tilde{t}(x)} + A \quad (6)$$

Figure 4:
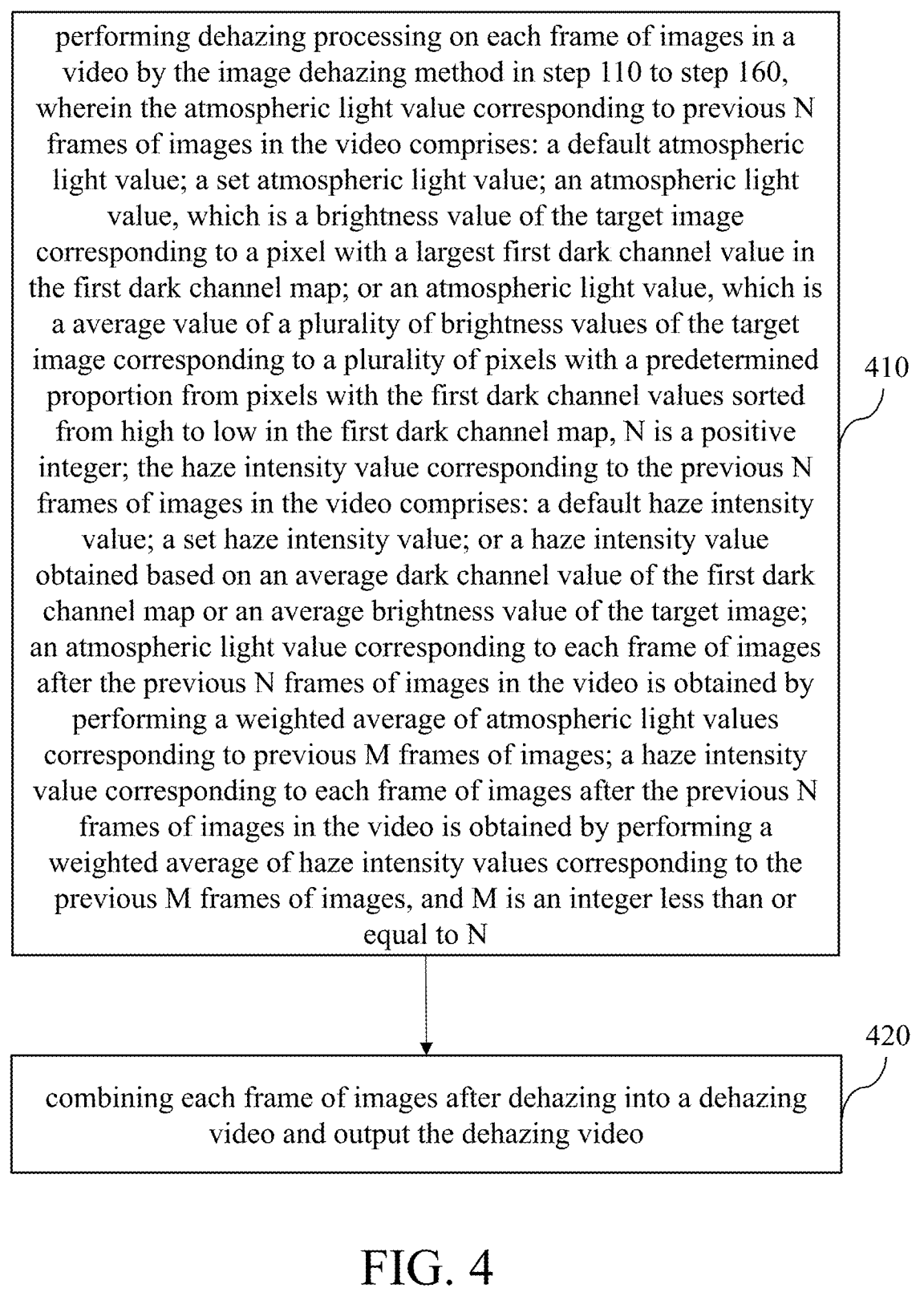

Please refer to FIG. 1 and FIG. 4, wherein FIG. 4 is a schematic flowchart of a video dehazing method according to an embodiment of the present disclosure. As shown in FIG. 1 and FIG. 4, the video dehazing method comprises the following steps of: performing dehazing processing on each frame of images in a video by the image dehazing method in step 110 to step 160, wherein the atmospheric light value corresponding to previous N frames of images in the video comprises: a default atmospheric light value; a set atmospheric light value; an atmospheric light value, which is a brightness value of the target image corresponding to a pixel with a largest first dark channel value in the first dark channel map; or an atmospheric light value, which is an average value of a plurality of brightness values of the target image corresponding to a plurality of pixels with a predetermined proportion from pixels with the first dark channel values sorted from high to low in the first dark channel map, N is a positive integer; the haze intensity value corresponding to the previous N frames of images in the video comprises: a default haze intensity value; a set haze intensity value; or a haze intensity value obtained based on an average dark channel value of the first dark channel map or an average brightness value of the target image; an atmospheric light value corresponding to each frame of images after the previous N frames of images in the video is obtained by performing a weighted average of atmospheric light values corresponding to previous M frames of images; a haze intensity value corresponding to each frame of images after the previous N frames of images in the video is obtained by performing a weighted average of haze intensity values corresponding to the previous M frames of images, and M is an integer less than or equal to N (step 410); and combining each frame of images after dehazing into a dehazing video and output the dehazing video (step 420).

That is, in step 410, the atmospheric light value and haze intensity value used in the current frame of images may be obtained by performing a weighted average of the atmospheric light values and the haze intensity values of the previous frames of images. Therefore, in an embodiment, when the dehazing processing is performed on each frame of images after the previous N frames of images in the video, an atmospheric light value and a haze intensity value corresponding to the next frame of images are simultaneously calculated.

Figure 5:
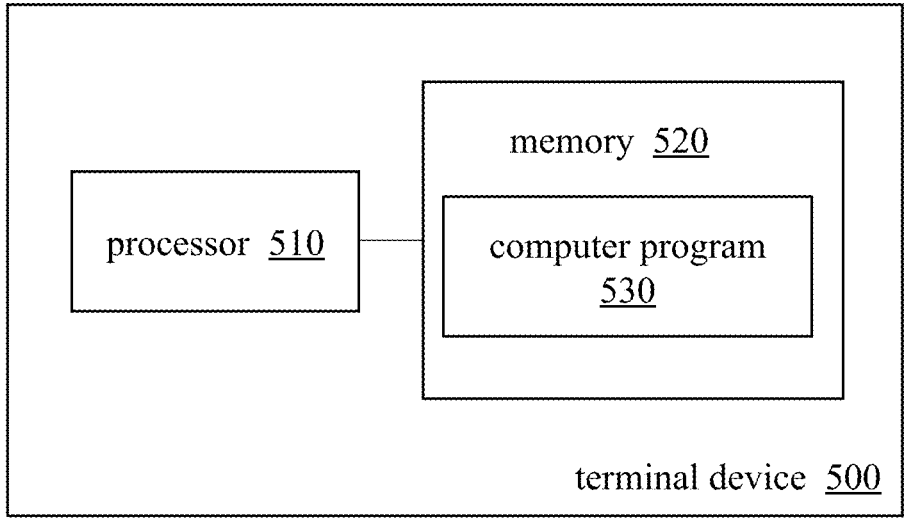
FIG. 5 is a block diagram of a terminal device according to an embodiment of the present disclosure.

Please refer to FIG. 5, which is a block diagram of a terminal device according to an embodiment of the present disclosure. As shown in FIG. 5, the terminal device 500 comprises one or more processors 510 and a memory 520, and the memory 520 is configured to store one or more computer programs 530. When the one or more computer programs 530 are executed by the one or more processors 510, the one or more computer programs 530 performs the image dehazing method of FIG. 1 or the video dehazing method of FIG. 4.

The present disclosure also provides a storage medium, in which a computer program is stored, and when the computer program is executed by a processor to perform the image dehazing method or the video dehazing method provided by the above embodiments, wherein the storage medium is a non-transitory storage medium, and may comprise a USB disk, a mobile hard disk, a read-only memory (ROM), a magnetic disk or optical disk and other media that can store program codes.

To sum up, in the embodiments of the present disclosure, the image dehazing method is suitable for performing dehazing processing in units of single points or filtering windows, and can avoid the halo effect generated by performing dehazing processing in units of filtering windows. In addition, the image dehazing method of the present disclosure performs image dehazing by using the estimated value of the transmittance obtained based on the dehazing intensity correction value, so that the area(s) with the high brightness value(s) in the hazy image can still maintain appropriate brightness after being dehazed, and the area(s) with different haze densities has(have) a good dehazing effect. Besides, the image dehazing method can also be applied to dehazing each frame of images in the video to obtain a dehazing video. Furthermore, when the atmospheric light value and/or the haze intensity value used in the image dehazing method is the default value or the user-set value, the process of traversing the dark channel map can be canceled to save bandwidth.

Although the above-described components are included in the drawings of the present disclosure, it is not excluded to use more other additional components to achieve better technical effects without departing from the spirit of the invention.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. An image dehazing method, comprising the following steps:

obtaining a second dark channel map corresponding to a target image based on a first dark channel value corresponding to each pixel in the target image;

obtaining an atmospheric light value;

obtaining a haze intensity value;

obtaining a dehazing intensity correction value based on the haze intensity value and the first dark channel value corresponding to each pixel in a first dark channel map, or based on the haze intensity value and a brightness value corresponding to each pixel in the target image;

obtaining an estimated value of a transmittance based on the dehazing intensity correction value, a second dark channel value corresponding to each pixel in the second dark channel map, and the atmospheric light value; and obtaining an estimated dehazed image based on the estimated value of the transmittance, the target image, and the atmospheric light value.

2. The image dehazing method according to claim 1, wherein the step of obtaining the second dark channel map corresponding to the target image based on the first dark channel value corresponding to each pixel in the target image comprises:

obtaining the first dark channel map corresponding to the target image;

obtaining a size of a filtering window;

obtaining a lower limit channel value corresponding to each pixel in the first dark channel map through a default function;

obtaining a first dark channel value of each pixel in the filtering window corresponding to each pixel in the first dark channel map; and obtaining the second dark channel value corresponding to each pixel in the first dark channel map based on the lower limit channel value corresponding to each pixel in the first dark channel map and the first dark channel value of each pixel in the filtering window, and then obtaining the second dark channel map.

3. The image dehazing method according to claim 2, wherein the step of obtaining the second dark channel value corresponding to each pixel in the first dark channel map based on the lower limit channel value corresponding to each pixel in the first dark channel map and the first dark channel value of each pixel in the filtering window comprises:

selecting a first dark channel value greater than or equal to the lower limit channel value in the filtering window corresponding to each pixel in the first dark channel map as a candidate dark channel value corresponding to each pixel in the first dark channel map; and selecting a minimum value among all candidate dark channel values corresponding to each pixel in the first dark channel map as the second dark channel value corresponding to each pixel in the first dark channel map.

4. The image dehazing method according to claim 2, wherein the step of obtaining the first dark channel map corresponding to the target image comprises:

selecting a minimum value of RGB components of each pixel of the target image to obtain the first dark channel map.

5. The image dehazing method according to claim 1, wherein the step of obtaining the second dark channel map corresponding to the target image based on the first dark channel value corresponding to each pixel in the target image comprises:

selecting a minimum value of RGB components of each pixel in the target image as the first dark channel value to obtain the second dark channel map, wherein the first dark channel value corresponding to each pixel in the target image is the second dark channel value corresponding to each pixel in the second dark channel map.

6. The image dehazing method according to claim 1, wherein the step of obtaining the estimated value of the transmittance based on the dehazing intensity correction value, the second dark channel value corresponding to each pixel in the second dark channel map, and the atmospheric light value comprises:

obtaining the estimated value of the transmittance based on the dehazing intensity correction value, the second dark channel value corresponding to each pixel point in the second dark channel map, the atmospheric light value and a default range.

7. The image dehazing method according to claim 1, wherein the step of obtaining the atmospheric light value comprises:

obtaining a default atmospheric light value; or setting the atmospheric light value; or selecting a brightness value of the target image corresponding to a pixel with a largest first dark channel value in the first dark channel map as the atmospheric light value; or selecting a plurality of brightness values of the target image corresponding to a plurality of pixels with a predetermined proportion from pixels with the first dark channel values sorted from high to low in the first dark channel map, and taking an average value of the plurality of brightness values as the atmospheric light value.

8. The image dehazing method according to claim 1, wherein the step of obtaining the haze intensity value comprises:

obtaining a default haze intensity value; or setting the haze intensity value; or obtaining the haze intensity value based on an average dark channel value of the first dark channel map or an average brightness value of the target image.

9. A video dehazing method, comprising the following steps:

performing dehazing processing on each frame of images in a video by the image dehazing method according to claim 1; wherein the atmospheric light value corresponding to previous N frames of images in the video comprises: a default atmospheric light value; a set atmospheric light value; an atmospheric light value, which is a brightness value of the target image corresponding to a pixel with a largest first dark channel value in the first dark channel map; or an atmospheric light value, which is an average value of a plurality of brightness values of the target image corresponding to a plurality of pixels with a predetermined proportion from pixels with the first dark channel values sorted from high to low in the first dark channel map, N is a positive integer; wherein the haze intensity value corresponding to the previous N frames of images in the video comprises: a default haze intensity value; a set haze intensity value; or a haze intensity value obtained based on an average dark channel value of the first dark channel map or an average brightness value of the target image; wherein an atmospheric light value corresponding to each frame of images after the previous N frames of images in the video is obtained by performing a weighted average of atmospheric light values corresponding to previous M frames of images, and a haze intensity value corresponding to each frame of images after the previous N frames of images in the video is obtained by performing a weighted average of haze intensity values corresponding to the previous M frames of images, M is an integer less than or equal to N; and combining each frame of images after dehazing into a dehazing video and output the dehazing video.

10. The video dehazing method according to claim 9, wherein when the dehazing processing is performed on each frame of images after the previous N frames of images in the video, an atmospheric light value and a haze intensity value corresponding to the next frame of images are simultaneously calculated.

11. The video dehazing method according to claim 9, wherein the step of obtaining the second dark channel map corresponding to the target image based on the first dark channel value corresponding to each pixel in the target image comprises:

obtaining the first dark channel map corresponding to the target image;

obtaining a size of a filtering window;

obtaining a lower limit channel value corresponding to each pixel in the first dark channel map through a default function;

obtaining a first dark channel value of each pixel in the filtering window corresponding to each pixel in the first dark channel map; and obtaining the second dark channel value corresponding to each pixel in the first dark channel map based on the lower limit channel value corresponding to each pixel in the first dark channel map and the first dark channel value of each pixel in the filtering window, and then obtaining the second dark channel map.

12. The video dehazing method according to claim 11, wherein the step of obtaining the second dark channel value corresponding to each pixel in the first dark channel map based on the lower limit channel value corresponding to each pixel in the first dark channel map and the first dark channel value of each pixel in the filtering window comprises:

selecting a first dark channel value greater than or equal to the lower limit channel value in the filtering window corresponding to each pixel in the first dark channel map as a candidate dark channel value corresponding to each pixel in the first dark channel map; and selecting a minimum value among all candidate dark channel values corresponding to each pixel in the first dark channel map as the second dark channel value corresponding to each pixel in the first dark channel map.

13. The video dehazing method according to claim 11, wherein the step of obtaining the first dark channel map corresponding to the target image comprises:

selecting a minimum value of RGB components of each pixel of the target image to obtain the first dark channel map.

14. The video dehazing method according to claim 9, wherein the step of obtaining the second dark channel map corresponding to the target image based on the first dark channel value corresponding to each pixel in the target image comprises:

selecting a minimum value of RGB components of each pixel in the target image as the first dark channel value to obtain the second dark channel map, wherein the first dark channel value corresponding to each pixel in the target image is the second dark channel value corresponding to each pixel in the second dark channel map.

15. The video dehazing method according to claim 9, wherein the step of obtaining the estimated value of the transmittance based on the dehazing intensity correction value, the second dark channel value corresponding to each pixel in the second dark channel map, and the atmospheric light value comprises:

obtaining the estimated value of the transmittance based on the dehazing intensity correction value, the second dark channel value corresponding to each pixel point in the second dark channel map, the atmospheric light value and a default range.

* * * * *